Dec. 31, 1940.                A. F. FISCHER                2,226,903
                              SAFETY CONTROL
                          Filed July 10, 1939            7 Sheets-Sheet 1

Inventor
A. F. Fischer
By Kimmel & Crowell
Attorneys

Dec. 31, 1940.  A. F. FISCHER  2,226,903
SAFETY CONTROL
Filed July 10, 1939  7 Sheets-Sheet 2

Inventor
A. F. Fischer
By Kimmel & Crowell
Attorneys

Dec. 31, 1940.  A. F. FISCHER  2,226,903
SAFETY CONTROL
Filed July 10, 1939   7 Sheets-Sheet 7

Inventor
A. F. Fischer
By Kimmel & Crowell
Attorneys

Patented Dec. 31, 1940

2,226,903

UNITED STATES PATENT OFFICE 2,226,903

SAFETY CONTROL

Arnold Ferdinand Fischer, Bronx, N. Y., assignor to Minco Products Corporation, New York, N. Y., a corporation of New York Application July 10, 1939, Serial No. 283,711

13 Claims. (Cl. 192—144)

This invention relates to a safety control for use in connection with power operated machines in general, more particularly to a machine including a driven structure operated from the prime mover, by way of example the driven structure of a wire stitch machine and with such structure having as elements thereof movable staple forming and driving means. It is to be understood, however, that the safety control, in accordance with this invention is for use in connection with any form of power driven machines for which it may be found applicable.

The invention aims to provide, in a manner as hereinafter set forth, a safety control including means for automatically disconnecting a driven structure from a prime mover when an obstacle presents itself in the path of a movable part of the said driven structure.

A further object of the invention is to provide, in a manner as hereinafter set forth, for detecting an obstacle in the path of a movable part of a driven structure and to automatically arrest the operation of said movable part on such detection.

A further object of the invention is to provide, in a manner as hereinafter set forth, for detecting an obstacle in the path of a movable part of a driven structure and to automatically discontinue the operation of said movable part on such detection.

A further object of the invention resides in the providing, in a manner as hereinafter set forth, of a safety control including an explorer for determining the presence of an obstacle in the path of a movable part of a machine travelling towards a work holder and with the control further including means for automatically discontinuing the operating of said movable part upon the presence of an obstruction in its path towards the work holder.

Further objects of the invention are to provide, in a manner as hereinafter set forth, a safety control for the purpose referred to which is comparatively simple in its construction and arrangement, strong, durable, compact, readily installed with respect to the machine with which it is to be adapted, thoroughly efficient in its use, and comparatively inexpensive to manufacture.

Embodying the foregoing objects and others which may hereinafter appear, the invention consists of the novel construction, combination and arrangement of parts as will be hereinafter more specifically referred to and illustrated in the accompanying drawings, wherein is shown embodiments of the invention, but it is to be understood that changes, variations and modifications may be resorted to which fall within the scope of the invention as claimed.

In each form of control as shown it is to be associated with a driven structure including any suitable means for operating a movable part thereof. By way of example when the control is employed in connection with a wire stitching machine the movable parts of the driven structure of the machine will consist of a staple former and a staple driver for moving in a direction towards a work holder. The driven structure of the stitching machine is to include any suitable means for reciprocating the staple former and the staple driver.

Referring to Figures 1 to 7, the body portion 10 of the machine with which the control is associated is in the form of a suitable casting which has its front enlarged, as at 11 to provide an open front chamber 12. The enlargement 11 is flanged, as at 13 against which is adapted to be secured a closure plate, not shown for the chamber 12. The body 10 is provided longitudinally thereof with an opening 13a for the passage of the prime mover, forming an element of the machine into the chamber 12. The prime mover, by way of example is illustrated as an operating or driving shaft 14 actuated from any suitable means, not shown. The rear wall of the chamber 12 includes an upper portion 15, an intermediate portion 16 and a lower portion 17. The portion 16 is disposed at right angles to the portions 15, 17, and also parallel to the axis of the shaft 14. The rear end of the portion 16 merges into the upper end of the portion 17. The forward end of the portion 16 merges into the lower end of the portion 15. The body portion 10 in its upper part is formed with a vertically disposed channel 18 open at each end, and associated with its upper end is a removable closure 19 for such end. The purpose of the channel 18 will be presently referred to. The channel 18 at its lower end opens through the rear wall forming portion 16 into chamber 12. The body portion 10 below the opening 13a is provided with a socket 20 which opens into the chamber 12 through the rear wall forming portion 17. The socket 20 is disposed lengthwise of the body portion 10 and the function of such socket will be hereinafter referred to. The lower portion of the enlargement 11 of the body 10 is formed with a vertically disposed passage 21 which opens at its lower end at the lower end of enlargement 11 and at its upper end into the chamber 12. The purpose of the passage 21 will be hereinafter referred to.

Figures 1, 5, 6, 7:
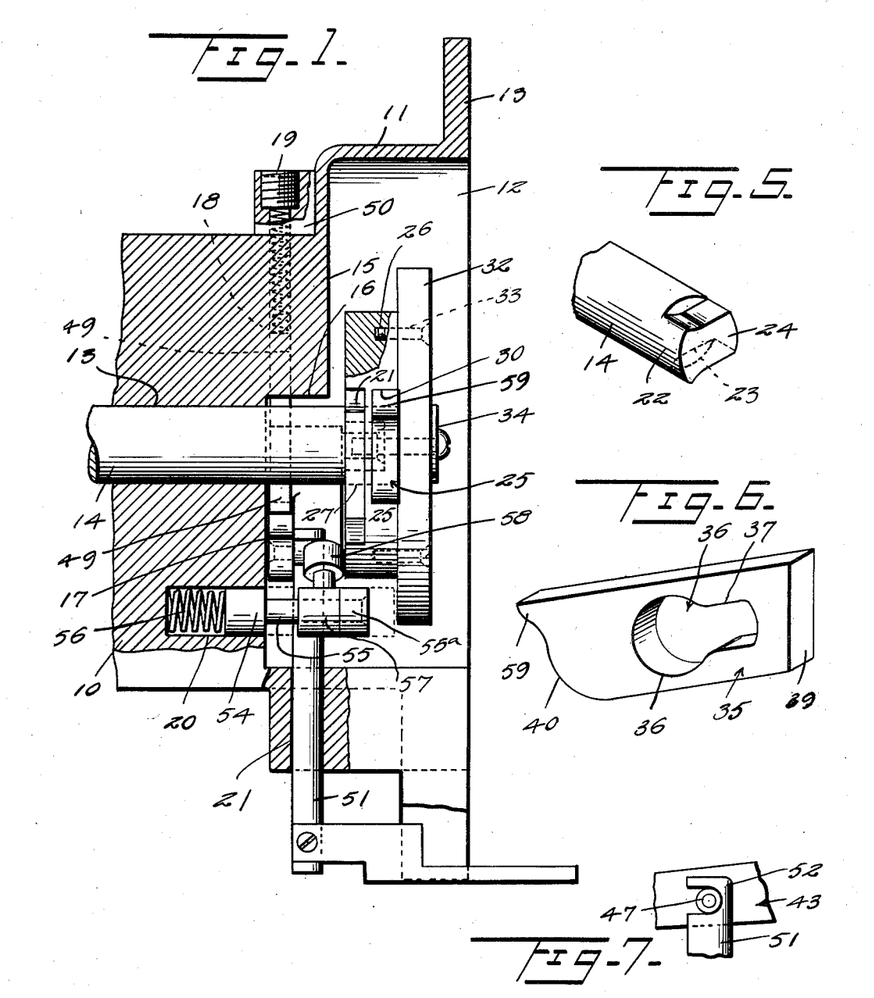
Figure 1 is a section on line 1—1 Figure 2, showing the adaptation of a safety control, in accordance with this invention with respect to a driven structure and a prime mover for the latter.
Figure 5 is a fragmentary view in perspective illustrating one end of the driving shaft or prime mover.
Figure 6 is a perspective view of the coupling plate between the prime mover and the driving structure.
Figure 7 is a detail in elevation illustrating the connection between the explorer and the shifting lever for the latter.

The shaft 14 has a reduced forward end terminal portion 22 and the latter is substantially in the form of a key-hole opening and a set-up of an enlarged part 23 and a reduced part 24. The part 23 is what may be termed of flared contour. The part 24 is of substantially rectangular form and it is disposed concentrically with respect to the part 23.

Loosely mounted on the shaft 14 inwardly of and in proximity to the said terminal portion 22 is a combined actuator and carrier element 25 consisting of a substantially circular disc-like body 26. The latter is formed axially thereof with an opening 27 for the purpose of mounting the body 26 on the shaft 14. The outer edge of the body 26, for a portion of its circumference is provided with an off-set part 28 to form a cam or cam surface. The rear face of body 26 is provided with a pocket 29, which opens at the outer edge of body 26 and is spaced from the follower end of the cam surface 28. The rear face of body 26, other than that portion formed with the pocket 29 is flat and uninterrupted. The forward face of the body 26 is provided diametrically thereof with a groove 30 closed at its inner end, as at 31 and which has its outer end opening at the outer edge of the body 26.

There is to be secured to the outer or forward face of the element 25 any suitable form of driving means for operating a work acting upon means or structure. By way of example, this latter means may be the staple former and the staple driver of a wire stitching machine. By way of example, the driving means or structure for the work acting upon elements is illustrated in the form of a circular disc 32 of greater diameter than the element 25. The disc 32 is secured to the element 25 by the holdfast means 33. There is extended through the disc 33 and engageable with the terminal portion 22 of the shaft 14 suitable means, as indicated at 34, which acts to retain the element 25 on the shaft. The element 25 acts to operate the disc 32 and said means 34 permits of said disc 32 revolving thereabout. It is to be understood that the driving means 32 illustrated by way of example, may be in the form of a cam or a crank mechanism utilized to drive the movable part of such means 32, such movable part may be of plunger-like type or in the form of staple formers and drivers.

The control, according to this invention acts to arrest the operating stroke of the movable part of the said driving means 32, if an obstruction is disposed in the operative path of such movable part.

The terminal portion 22 of the shaft 14 is arranged within the groove 30 formed in the body 26. Slidably mounted in the groove 30 and into which extends terminal portion 22 of the shaft 14 is a normally spring urged driving and coupling plate 35, which normally coacts with said terminal portion 22 for coupling the element 25 with the shaft 14 whereby the driving means 32 will be driven. The coupling plate 35 is formed with a key-hole shaped opening 36 in which is arranged said terminal portion 22. The opening 36 is of greater dimension than the terminal portion 22 of shaft 14. The opening 36 includes a contracted portion 37 having opposed walls thereof associated with the part 24 of the terminal portion 22, whereby when the part 24 associates with said portion 37 the plate 35 will be carried with the shaft 14 and the element 25 will be revolved with the shaft. The opening 36 is substantially of the same contour as the terminal portion 22 and when shaft 14 is in driving relation relative to the plate 35 a portion of the wall of the enlarged part 38 of the opening 36 will also coact with the part 23 of the terminal portion 22. The enlarged part 38 of the opening 36 is of a dimension to provide of the terminal portion 22 of shaft 14 to revolve therein when the plate 35 is not in a position to clutch element 25 to shaft 14.

The plate 35 includes an inner flat end edge 39 and an outer end edge 40 substantially of ogee curvature. The plate 35 is of less length than the groove 30. Interposed between the edge 39 of plate 35 and the inner end 31 of the groove 30 is a spring 41 which normally urges the plate 35 to maintain engagement with the part 24 and a portion of the part 23 of the end terminal portion 22 of the shaft 14, whereby as the latter operates the plate will be revolved with the shaft 14 and impart a like movement to the element 25 whereby the means 32 will be operated.

Pivotally connected to the inner wall of the chamber 12, as at 42 is a bell crank lever 43 having an upstanding arm 44 and a substantially horizontally disposed arm 45. The latter is of greater length than the arm 44. Normally the arm 45 extends at a downward inclination from the pivot 42. The upper end of the arm 44 is provided with a laterally disposed roller 46. The arm 45 intermediate its ends is provided with a laterally disposed roller 47. The arm 45 in its top edge is formed with a cut-out, as at 48 to provide a seat. The lever 43 is arranged rearwardly of the element 25. The lever 43 is spring pressed and for this purpose a spring urged plunger 49 is provided and which permanently bears against the seat 48. The plunger 49 is mounted in the channel 18, depends through the wall forming portion 16 and extends below the shaft 14. The urging spring of the plunger 49 is indicated at 50 and which is arranged in the channel 18 between the upper end of the plunger 48 and the closure 19.

There is associated with the lever 43 an explorer 51 which extends down through the passage 52 formed in the lower portion of the enlarged part 11 of the body 10. The upper end of the explorer 51 is of hook-like form, as at 53 for taking over the roller 47 or rather for overlapping the roller 47 whereby the lever 43, when shifted will vertically move the explorer 51.

Arranged with the socket 20 and extending into the chamber 12 is a spring urged plunger 54. The plunger 54 intermediate its ends is provided with a peripheral groove 55, and at its outer end with a roller 55ª. The urging spring for the plunger 54 is indicated at 56 which is interposed between the inner end of the plunger 54 and the base of the socket 20. The outer portion of the plunger 54 is provided with a stem 57 disposed at right angles thereto and carrying a roller 58. The plunger 54 and the roller 58 constitutes what may be termed a device for shifting plate 35 and a stop for the lever 53. The said device coacts with the element 25 for releasably holding the plunger 54 in retracted position to thereby permit the plunger 54 to be projected to a position in the path of the end 40 of the plate 35.

Figure 2:
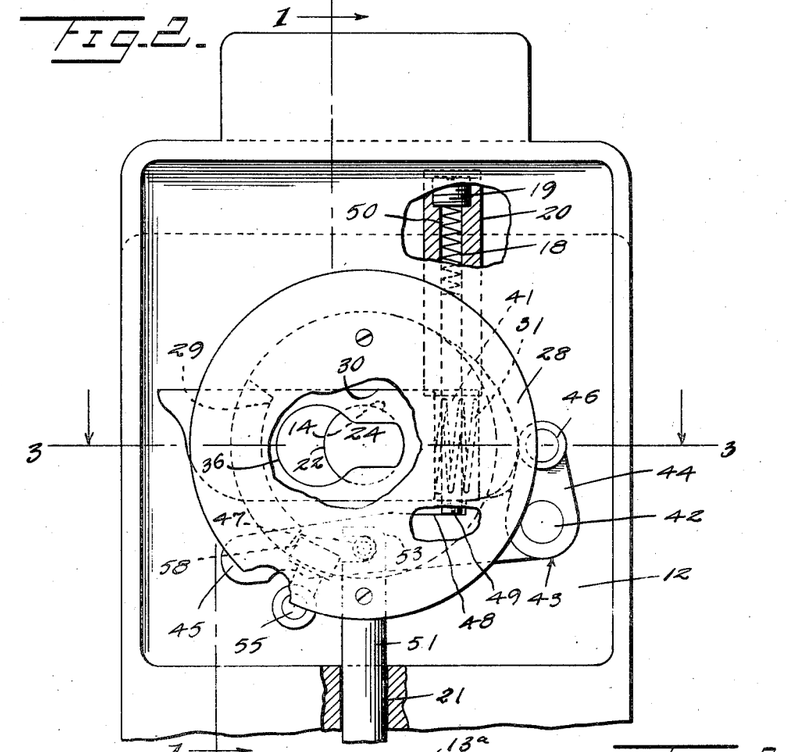
Figure 2 is a front elevation partly broken away.
Figures 3, 4:
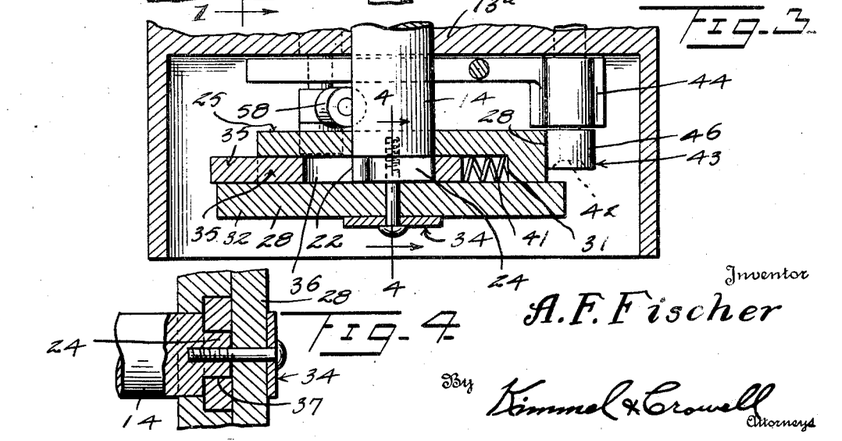
Figure 3 is a section on line 3—3 Figure 2.
Figure 4 is a detailed section on line 4—4 Figure 3.

The normal position of the control is as shown in Figure 2 and with the coupler plate 35 extended from the open end of the groove 30. On the operation of the element 25, when the plate 35 couples it to the shaft 14 by the spring 41 and due to the cam surface 28 the element 25 will oscillate lever 45 on its pivot moving its arm 45 into and out of the groove 55, and as the roller 58 rides against the rear face of the element 25 it will prevent the projecting of the plunger 54. As element 25 continues to revolve the roller 58 under normal conditions will not enter the pocket 29 because at this time the lever has been lowered to an extent to engage in the groove 55. Now it will be assumed that the explorer 51 has met with an obstruction which prevents the lowering of the arm 45 of the lever 43 to an extent to enter the groove 55 of the plunger 54. Under such conditions when the roller 58 registers with the pocket 29 the spring 56 will be permitted to act to thereby force the roller 58 into the pocket 29 and allow of the plunger to be projected to the dotted line position shown in Figure 1 and oppose the outer edge of the element 25. As the latter continues to revolve, the curved outer edge of the plate 35 will engage the plunger 54 and the coaction of the plunger with such edge will force the plate 35 inwardly from its clutching position with respect to the end terminal portion 22 of the shaft 24 thereby discontinuing the operation of the means 32. Under such conditions the said means of the structure 32 will remain inactive, but the prime mover for the shaft 34 will be operating. The inward shift of the plate 35 will be held in non-clutching position by the shape of the edge 40 of the plate coacting with the plunger 54. The shape of edge 40 is such as to provide a stop 59. When the obstruction is removed from the path of the explorer and the plunger moved inwardly the parts will assume the position as shown in Figure 2. When the plunger 54 is moved inwardly it carries the roller 58 out of the pocket 56.

With reference to the modified form of control shown by Figures 8 to 16, it will be stated that the difference between it and the control shown by Figure 1 resides in a different form of actuator and carrier element, bell crank lever, slidable controlling means and prime mover, as well as locating the combined shifter and stop device at a higher level than the location of such device in Figure 1.

Those parts of the modified form of control which correspond to like parts of the form of control shown by Figures 1 and 2 are provided with reference characters which correspond to the reference characters for the corresponding parts shown by Figures 1 and 2. It is thought unnecessary to specifically refer to the parts of the modified form of control which correspond to parts of the control shown in Figures 1 and 2. It is to be understood that the parts of the modified form of control which correspond to parts of the control shown by Figures 1 and 2 function in the same manner and are for the same purpose as such parts referred to relative to the form shown by Figures 1 and 2. The bell crank lever, to be referred to of the modified form functions in the same manner as lever 43.

With reference to Figures 8 to 14, a prime mover is indicated at 60 and which is in the form of a shaft of uniform diameter, that is to say the shaft which provides the prime mover 60 is not formed with a reduced end terminal portion as the prime mover 14 shown in Figure 1. The actuator and carrier element of the form of control shown by Figures 8 to 16 is generally indicated at 61 and comprises an inner section 62 and a pair of outer sections 63 arranged in opposed spaced parallel relation and of like form. The section 62 is in the form of a substantially circular disc like body. Each of the sections 63 is of segmental contour and when arranged relative to section 61 have their straight edges disposed in parallel spaced relation. The sections 62, 63 are secured in abutting relation by the holdfast means 64.

The section 62 is of the desired thickness and of greater thickness than the sections 63. The section 62 has a portion of its edge circumferentially thereof formed with a curved off-set part which constitutes a cam or cam surface 65. The rear face of the section 62 is formed with a pocket 66 which is of greater circumferential length than the pocket 29 on the rear face of element 25. The pocket 66 is arranged rearwardly of the cam 65. The section 62 is also formed in its outer face with a diametrically extending groove 67 which is open at each end and is disposed an equidistance from each side of the diametric center of the section 62. The front face of section 62 is formed with a groove 68 arranged at right angles to and which intersects the groove 67. The groove 68 extends from both of the side walls of the groove 67, but the distance that the groove 68 extends from one side wall of the groove 67 is less than the distance it extends from the other side wall of the groove 67. The groove 68 opens at one end at the edge of the section 62 and its other end is closed as indicated at 69. The groove 68 is of greater depth but of less width than the groove 67. The section 62 is formed with an opening 70 which communicates with the inner end of the groove 68 and opens at the edge of the section 62. The opening 70 is of a diameter materially less than the width of the groove 68. The wall of the opening 70 is threaded, as at 71. The section 62 is provided in its front face with a cut-out 72 which opens into the groove 68. The section 62 is formed with a socket 73 which opens into the groove 67 through one of its side walls.

When the sections 63 of element 61 are secured to section 62, the straight edges 74 of the sections 63 extend inwardly relative to the side walls of the groove 67 to provide what may be termed an overhang.

The prime mover or shaft 60 extends into the chamber 12 and it may be formed integral with the rear face of the section 62 axially thereof, or the section 62 may be secured to the shaft by any suitable means whereby on the operation of the prime mover the element 61 will be bodily carried therewith. As shown shaft 60 is integral with section 62.

Figures 9, 11, 12:
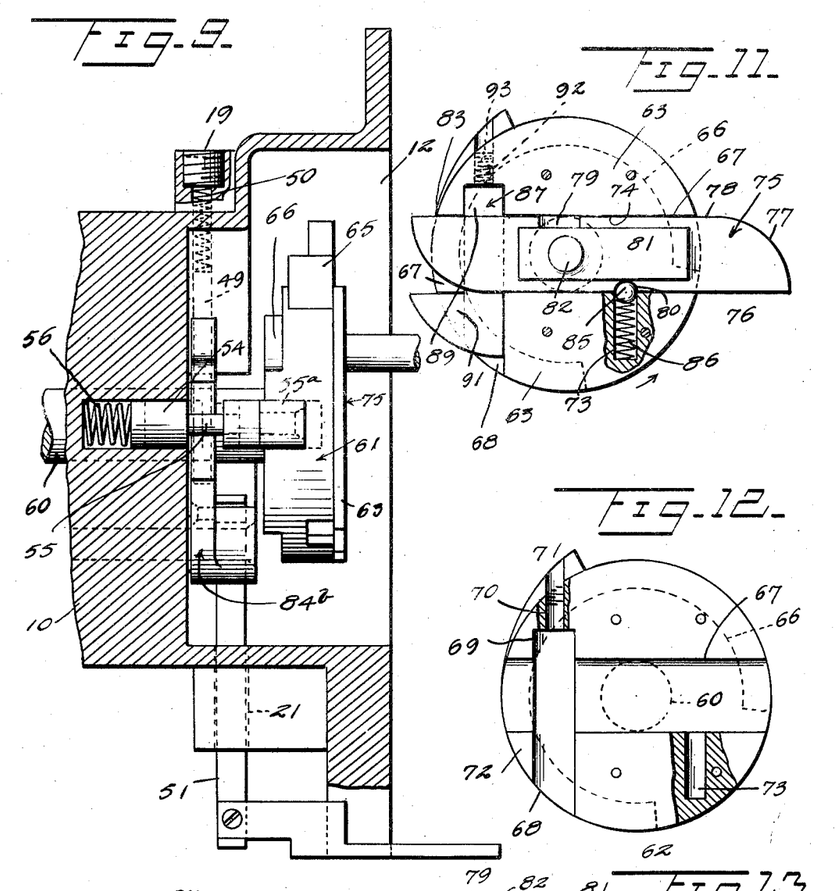
Figure 9 is a section on line 9—9 Figure 8.
Figure 11 is a front elevation illustrating a crank pin holder and a supporting and latching means for the holder forming elements of the control.
Figure 12 is a front elevation of the carrier for the crank pin holder.
Figures 10, 15, 16:
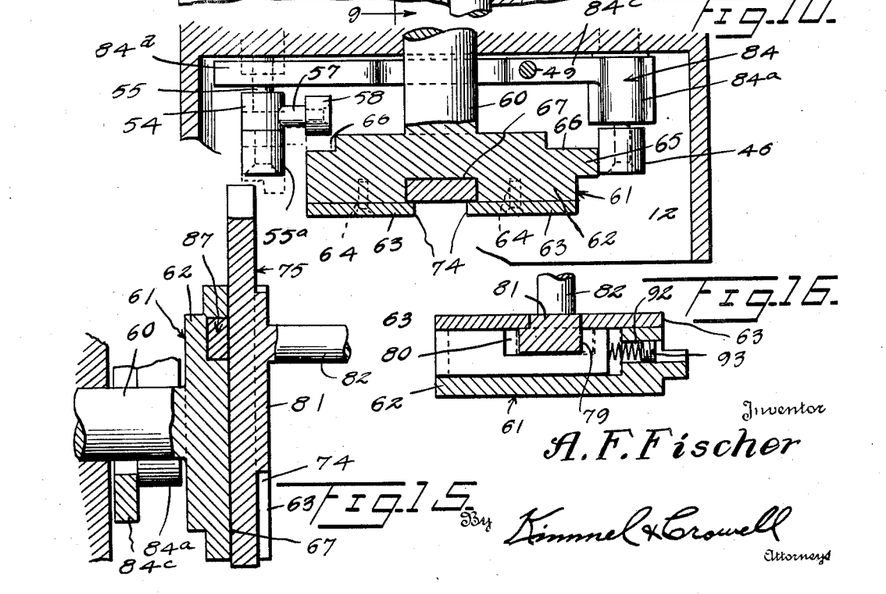
Figure 10 is a section on line 10—10 Figure 8.
Figure 15 is a section on line 15—15 Figure 8.
Figure 16 is a section on line 16—16 Figure 8.
Figures 13, 14:
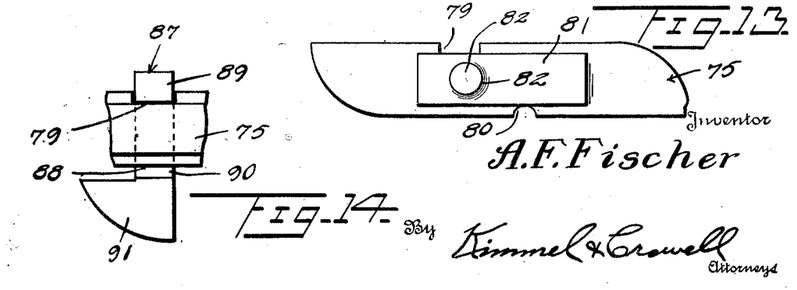
Figure 13 is a front elevation of the crank pin holder.
Figure 14 is a fragmentary view in elevation illustrating the key for latching the crank pin holder in its normal position.

There is slidably mounted in the groove 67 a crank pin carrying structure 75 formed of a plate 76 of a length greater than the diameter of the element 61. The plate 76 is formed with a pair of oppositely curved end edges 77. The curvature of each of said end edges is of a contour corresponding to the segment of a circle. The plate 76 has lengthwise edges 78 so related whereby the curvature of the end edges 77 will provide for the ends of the edges 78 to be disposed in extended relation with respect to each other. The plate 76 has one of its edges 78 formed with a rectangular notch 79 centrally of such edge. The other edge 78 of the plate 76 is formed with a curved cut-out 80 substantially centrally thereof. Secured to the outer face of the plate 76 and spaced equidistant from its edges 77 and 78 is a rectangular carrier 81 having secured to its front face a crank pin 82. The pin 82 is intersected centrally by the longitudinal median of the carrier 81. The pin 82 is disposed between the vertical median of and an end of the carrier. The crank pin 82 is adapted to have connected thereto a driven mechanism, not shown including a movable part adapted to be moved towards a work on a holder not shown.

The crank pin 82 is to be moved to a position in concentric relation with respect to the axis of the shaft 60 and to a position in eccentric relation with respect to the axis of the shaft 60. When the axis of the crank pin is in concentric relation with respect to the axis of the shaft 60, the distance between the axis of the pin 82 and the point 83 on the element 61 corresponds to half of the diameter of the section 62 of the element 61. When the pin 82 is disposed in concentric relation with respect to the axis of the shaft 60, it will not make active the said driven mechanism. When the pin 82 is disposed in eccentric relation with respect to the shaft 60 it will then make active the said driven mechanism, with which the pin is associated whereby the movable part of such driven mechanism will be shifted in a direction towards the work on the work holder. At this point it will be stated that the cam or cam surface 65 on the section 62 of the element 61 is arranged rearwardly of the groove 67 and further it is disposed in extended relation with respect to each side wall of the groove 67. The bell crank lever of the modified form, which functions for the same purpose as the bell crank lever 43 is indicated at 84 and has its upstanding arm 84$^a$ of the same form as the arm 44 of lever 43. The arm 84$^b$ of lever 84 is formed of a curved inner portion 84$^c$ and a straight outer portion 84$^d$ provided on its lower edge with a substantially semi-circular cut-out 84$^e$. The portion 84$^c$ is disposed in depending relation with respect to portion 84$^d$.

The safety position of the structure 75, is as shown in Figure 11 and it is latched in such position by a spring control ball 85 arranged in a socket 73 and engageable in the notch 80. Interposed between the ball 85 and the base of the socket 73 and positioned within the latter is the controlling spring 86 for the ball 85. The latter constitutes a latch.

There is associated with the structure 75, a locking device for releasably holding the pin 82 in eccentric relation with respect to the shaft 60 to thereby provide for the pin operating or making active the driven mechanism with which it is associated. The locking device is spring controlled and is carried by the section 62 of the element 61. The controlling spring for the locking device normally maintains the latter in extended relation with respect to element 61. The said locking device, generally indicated at 87 includes an angle shaped locking member 88 formed of a nose 89, a stem 90 and a substantially quadrant-shaped cam 91 secured to and extended laterally from the stem 90. The nose 89 is disposed at right angles to the stem 88 and its function is to engage in the notch 79 for releasably locking the structure 75 in a position which disposed the pin 82 eccentrically with respect to the shaft 60. The locking device 87 is arranged in the groove 68 and with the cam 91 thereof extending outwardly through the cut-out 72 and disposed in extended relation with respect to the edge of the section 62 of the element 61. Arranged in the opening 70 and bearing against the nose 89 is a controlling spring 92 which normally acts to maintain the cam 91 in extended relation with respect to the element 61. The opening 70 is closed by a plug 93 engaging the threads 71. The spring 92 is interposed between the plug and the nose 89. The locking device 87 is adapted to be shifted in a direction against the action of the spring 92 to remove the nose 89 from the notch 79 to release the structure 75. The combined shifter and stop device 94$^a$ formed of the spring controlled plunger 54 and roller 58 is disposed at a higher level than its portion shown in Figure 1. The cut-out 84$^e$ on lever 84 provides of the latter entering the groove 55 and encompassing the reduced portion of plunger 54.

Figure 8:
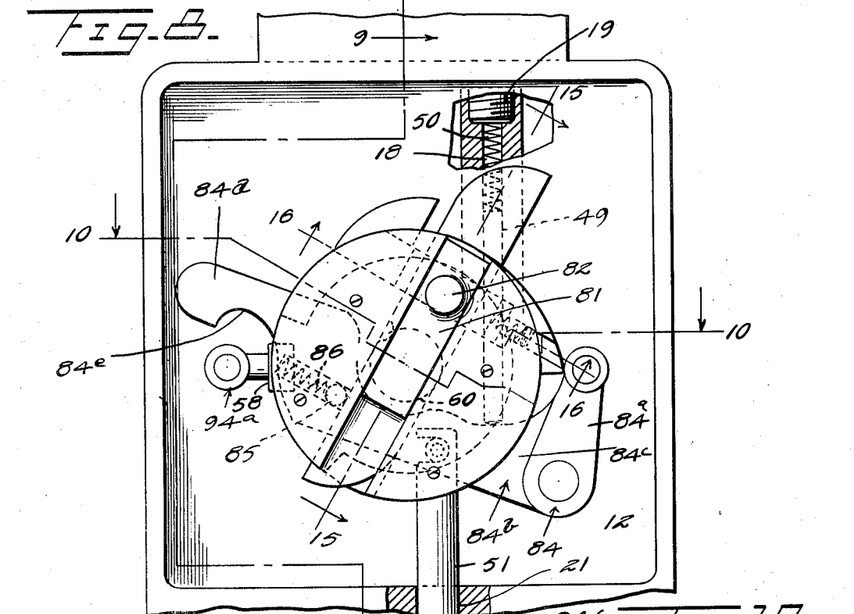
Figure 8 is a front elevation of a modified form of safety control as applied to a driving structure and a prime mover and with the control broken away and partly in section.

The normal position of the control is as shown in Figure 8 and with the structure 75 extended from the end 94 of the groove 67.

Briefly, the action of the safety device (Figure 8) during a cycle of the machine in which the control is operating is as follows:—

The explorer drops due to the lowering of the lever 84 by the cam surface 65 in connection with the spring which is associated with the lever. The action of the cam surface 65 on the lever 84 is provided with a rotation of the part which carries the cam surface. As the explorer drops or moves downwardly and in such movement should discover a foreign object in its path it will prevent the engagement of the lever 84 with the groove 55 in the plunger 54. On continued rotation of the shaft, the roller 58 on the plunger 54 will approach the pocket 66 and since the lever 84 is not in engagement with the groove 55 in the plunger 54, the controlling spring for the plunger will cause the roller 54 to enter the pocket 66 carrying the plunger 54 in the same direction. This places the plunger 54 in a position to contact the cam 91 of the locking device. On continued rotation of the shaft, the plunger 54 will coact with the cam 91 and move the locking device from engagement with the structure 75. On continued rotation, the structure 75 will contact with the plunger 54 causing such structure 75 to slide in the groove 67 in a direction for carrying the crank pin from eccentric to concentric position. The projection of the structure 75 is substantially equal to the eccentricity of the crank pin. The driver structure operated or made active from the crank pin has now been rendered inactive while the crank pin is rotating concentrically with the shaft, as the structure 75 has been latched in such position. The opposite end of the structure 75 has been projected outwardly as shown in Figure 11. On continued rotation the roller 58 carried by the plunger 54 remaining in the pocket 66, such plunger will contact the outwardly projected end of the structure 75 to cause such structure to slide in its groove 67 carrying the crank pin from concentric position to eccentric position. On continued rotation the roller 58 carried by the plunger 54 will be contacted by the end of the pocket and will be forced inwardly carrying the plunger 54 away from its contacting position with the structure 75. The shaft continues its revolution to the end of the cycle. The crank pin has been prevented from travelling through its normal operating path. Under normal operating conditions when the explorer does not meet with an obstruction, the lever 84 and the rear face of section 62 alternately maintain the plunger from engaging with the cam of the locking device.

When structure 75 is shifted from its position disposing the crank pin in concentric relation with respect to the prime mover it is latched in such position by the ball 85, and when the structure 75 is shifted to dispose the crank pin in eccentric relation with respect to the prime mover it is releasably locked in such position by the locking device 87.

The second modified form of safety control shown by Figures 17 to 25 is for the purpose of disconnecting a driven structure from its driving means (prime mover) to discontinue the operation of such structure when an obstruction is interposed in the path of the operative stroke of a moving part or parts of the driven structure in a direction towards work on a work holder. The adaptation of this second modified form of safety control is shown by way of example in connection with the staple forming and staple driving elements of a wire stitching machine, as well as the means for reciprocating said elements. The said elements and said means will be termed a driven structure.

This second modified form of safety control includes a controller, which will be termed an explorer, the latter is indicated at 100 and it is of a form similar to that disclosed by my co-pending application Serial No. 280,206, filed June 20, 1939. The explorer 100 is located with reference to a staple forming element 101 and a staple driving element 102 in the same manner as the controller of my aforesaid application is located. The explorer 100 includes an elongated shank 103 and a foot-piece 104 at and disposed at right angles to the lower end of the shank 103. The foot-piece 104 is located in the path of the operative stroke of the elements 101 and 102. The shank 103 intermediate its ends and on its inner side edge is formed with a cut-out 105 and above the latter it is also formed with a cut-out 106 opening at its outer side edge. The cut-out 106 is of less length than the cut-out 105. The staple forming element 101 is provided on one side edge with a lateral abutment 107 arranged in the cut-out 105 and positioned normally in proximity to the upper wall of the cut-out 105. The explorer 100 has formed integral therewith an extension 108 which is arranged in the cut-out 105 below and normally spaced from the abutment 107. Carried by the extension 108 is a spring controlled plunger 109 bearing against the lower wall of the cut-out 105 and acting to normally maintain the foot-piece 104 in extended relation and at the desired distance from element 101. The construction of the explorer as aforesaid corresponds to the construction of the controller forming an element of my application aforesaid.

The stitching head includes a driven shaft 110 for an operating means 111 for reciprocating the element 101, 102. The means 111 is of the same as that shown in my application aforesaid. The driven structure of the stitching head not only includes the elements 101, 102, the means 111, the shaft 110, but also a holder 112 which is fixed to shaft 110 by the pin 113. The holder 112 is preferably of circular cross section and it comprises a section 114 and a section 115. The section 114 is formed of a pair of portions 116, 117 of like outer diameter. The section 114 is also formed with a pair of portions 118, 119 of like outer diameter but of an outer diameter less than the portions 116, 117. The portion 116 is spaced from the portion 117 by the portion 118. One end of the portion 119 merges into the portion 116. The holder 112 is formed with an axial opening 120 for the passage of the shaft 110, the latter projects from the portion 117 and such projecting portion of the shaft is indicated at 121.

The holder is formed lengthwise thereof with a square socket 122 having its closed end or base indicated at 123 disposed in proximity to the end 124 of the holder. The socket 122 opens at the end 125 of the holder. The socket 122 has a part thereof arranged in the said portion 119 and its remaining portion extending through the portions 116, 117, 118. A prime mover for the shaft 110 is indicated at 126 and it is operated from any suitable source. As shown by way of example the prime mover 126 is in the form of a pulley 127 having a hub 128 extending from its inner side. The prime mover 126 is formed with an axial opening 129 which extends through the pulley 127 and the hub 128. The opening 129 is of greater diameter than the diameter of the shaft 110. Mounted on the shaft portion 121 is a bushing 120 upon which is mounted the prime mover 126. The hub 128 abuts against the end edge 125 of the holder 112. The prime mover 126 is retained on the shaft 110 by a collar 131, secured by a pin 132 to the shaft portion 121 and abutting the pulley 127.

The portions 116, 117 of the holder 112 coact with the portion 118 to provide the holder 112 with an annular peripheral groove 133 for the reception of a shiftable latch 134 for a coupling pin to be hereinafter referred to. The latch 134 is of plate like form and is provided with a concave inner edge 135. Secured to the latch 134, by the holdfast means 136 is a pull bar 137 which is operated from the foot pedal of the machine. The foot pedal is not shown. The latch 134 is not directly connected to the holder 112 whereby the revolving of the latter from the shaft 110 will not be retarded in any manner by the latch 134.

The hub 128 of the pulley 127 is formed with a socket 138 which opens at the end 125 of the holder 114. Arranged in the socket 122 is a spring urged coupling pin 139 which is normally held in retracted position by the latch 134. The contour of the pin 139 corresponds in contour to that of the sockets 122, 138 substantially. The urging spring of the pin 139 is indicated at 140 and it is interposed between the inner end of the pin 139 and the base of the socket. The spring 140 permanently tends to urge the pin 139 in extended relation with respect to the socket 122, but such action of the spring relative to the pin 139 is interrupted by the latch 134. When the latch 134 is shifted to release the pin 139, the latter will project from the mouth of the socket 140 and eventually during the revolving of the pulley 127 it will engage in the socket 138 whereby the driven structure is coupled to the prime mover 126 resulting in the operation of such driven structure.

Figures 20, 21, 22:
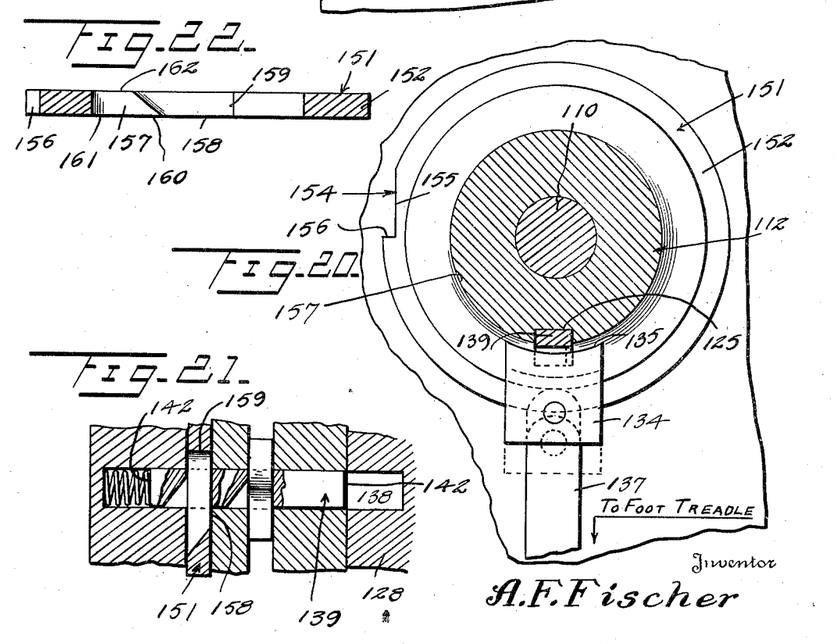
Figure 20 is a section on line 20—20 Figure 18.
Figure 21 is a section on line 21—21 Figure 18.
Figure 22 is a sectional detail.

The coupling pin 139 with reference to Figures 21 and 22 consist of an oblong bar 141 having squared end faces 142. The bottom face 143 of the bar 141 is formed with a pair of cut-outs 144, 145, the latter is arranged in advance of the cut-out 144. The cut-outs are of like form open at each side and include a squared forward wall 146 and a rear wall having a straight part 147 and an inclined part 148. The part 148 inclines rearwardly from the part 147 to a side of the bar 141.

It will be assumed that the latch 134 is clear of the pin 139 and it is desired to release the pin from its engagement with the hub 128. As the latch 134 moves upwardly it enters a groove 133 and as the holder 112 is revolving it will eventually bring the pin 139 to a position to be engaged by the latch. When the latch engages with the pin it rides against the inclined wall 148 of the notch 145, shifts the pin rearwardly and assumes a position between the part 147 and the wall 146 of the cut-out 145, the pin 139 then will be held in retracted position and the holder, as well as the shaft 110 will not be driven from the prime mover 126.

The section 115 of the holder 112 coacts with the portions 116 and 119 of the holder to provide the latter with a peripheral groove 149. The section 115 is secured to the section 114 of the holder 112 in a manner to maintain the section 115 in spaced relation relative to the portion 116 of the section 114. The base of the groove 149 indicated at 150 is formed by a part of a portion 119 of the section 114. Arranged in the groove 149 and of greater diameter than the holder 112 is a shifter element 151 in the form of a flat annulus 152 having its outer edge 153 formed with a tangentially disposed cut-out 154 consisting of a wall 155 and a wall 156 which extends at right angles from the inner end of the wall 155 and constitutes a stop. The wall 155 is of materially greater length than the wall 156 and it is disposed substantially tangentially relative to the element 151. The inner edge 157 of the annulus 142 is provided with a cut-out 158 opening at the side faces of the annulus 152 and having a straight wall 159 and a beveled wall 160. The wall 160 inclines rearwardly from the front face 161 of the annulus 152 to the rear face 162.

Figures 17, 25:
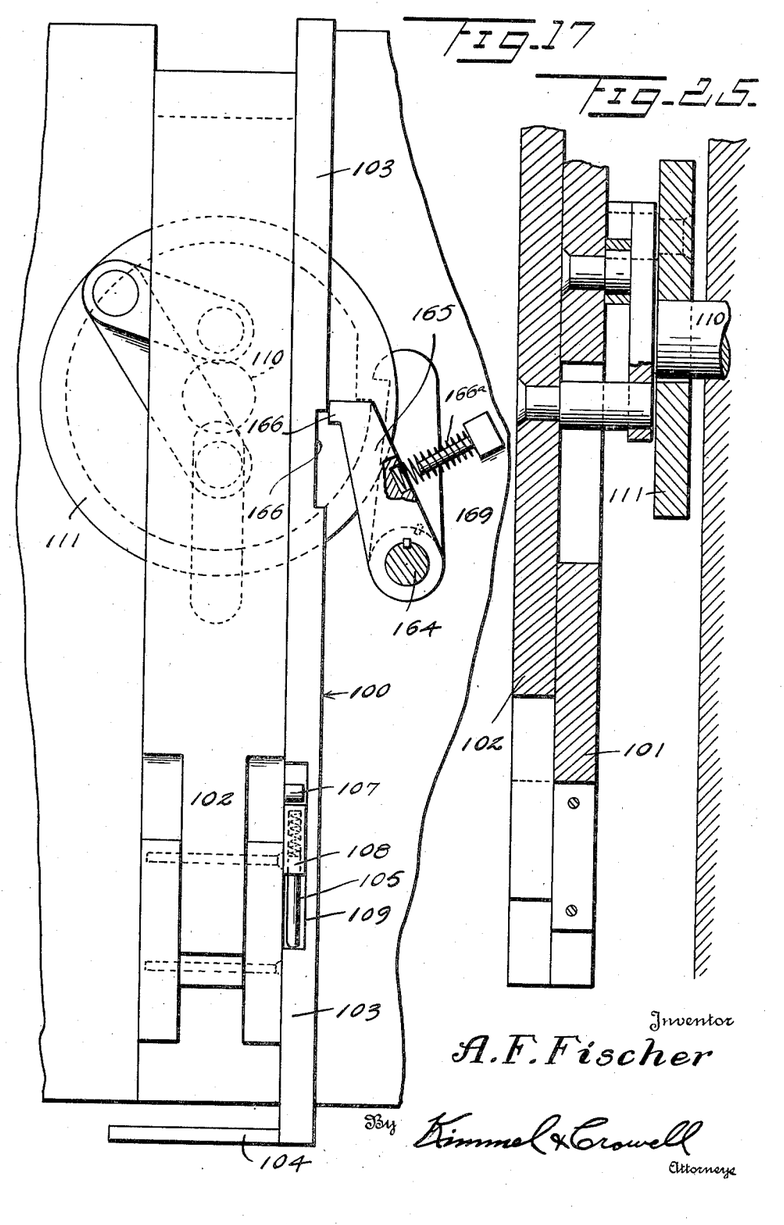
Figure 17 is in front elevation of still another modified form of safety control showing the adaptation thereof with respect to the driven structure of a head of a wire stitching machine.
Figure 25 is a vertical sectional view illustrating the staple former and driver of a wire stitching machine and the means for reciprocating said former and driver.
Figures 18, 23, 24:
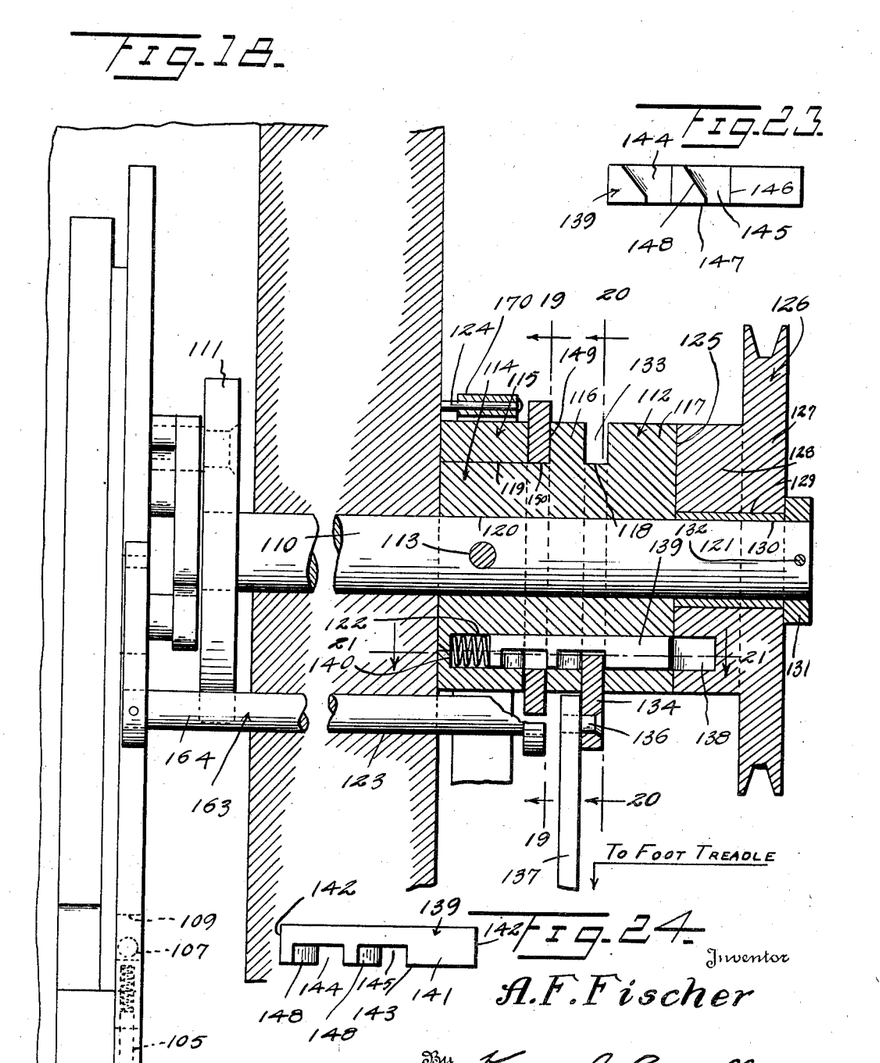
Figure 18 is a view partly in vertical section and partly in side elevation of the driven structure of a stitching head for a wire stitching machine showing the adaptation therewith of this second modified form of safety control.
Figure 23 is an inverted plan view of the coupling pin.
Fig. 24 is a side elevation of the coupling pin.
Figure 19:
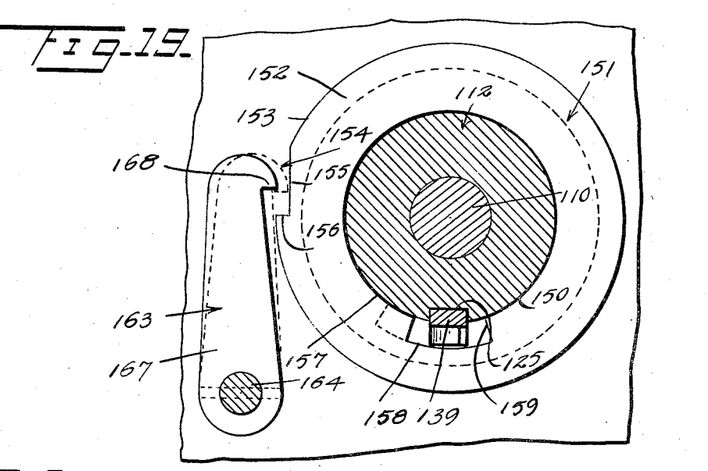
Figure 19 is a section on line 19—19 Figure 18.

This second modified form of control includes a shiftable latching structure 163 which is controlled by the explorer 100. The structure 163 includes a rock shaft 164 which is journaled in the body of the machine (Figure 18). The shaft 164 is arranged below the holder 112 and has fixed to one end thereof a latch pawl 165 formed with a nose 166. The other end of the shaft 164 has fixed thereto a holding pawl 167 formed with a nose 168. The pawl 165 is spring urged to its latching position by the means 166ᵃ (Figure 17). The latching position of the pawl 165 is against an edge of the explorer 100 adjacent to the notch 106. The pawl 167 is upstanding in its normal position with its nose arranged above the stop formed by the wall 156 of the cut-out 155. The position of the nose of the pawl 167 is such that when it is released, in a manner to be referred to the said nose 168 will be arranged in the path of the wall 156 of the cut-out 155 to alternately arrest the shifting of the element 151.

When the machine, with which the second modified form of control is employed is operating, under normal conditions the nose 166 of the pawl 165 will be in the position relative to the explorer 100 as shown in Figure 17.

The holding pawl 167 also acts to prevent the shaft 164 from rocking due to the fact that the element 151 prevents the shifting of pawl 167 until such pawl opposes the cut-out 154, but attention is also directed to the action of the pawl 165 with respect to the shaft 164, and in this connection it will be pointed out that under normal conditions pawl 165 cannot be shifted to rock the shaft 164. Therefore under normal conditions the said pawls will not interfere with the operation of the machine. The nose 166 of the pawl 165 and the outer edge of the annulus 142 alternately act to prevent any possibility of rocking or shifting of the shaft 164.

Now it will be assumed that the explorer 100 meets with an obstruction as it moves in a direction towards the work on the work holder, and when explorer 100 meets an obstruction its downward movement is arrested whereby the notch 106 will be positioned to oppose the nose 166 of the pawl 165, but the nose 166 cannot enter the notch 106 because the pawl 167 is riding against the non cut-out portion of the outer edge of the annulus 152 and which retains pawl 165 from moving in notch 106. When pawl 167 has its nose clear of the non cut-out portion of the outer edge of the annulus 152, the nose 166 of the pawl 165 will be forced into the notch 106 and when so forced it will rock shaft 164 in the direction of the arrow 169 whereby as pawl 167 is fixed to the shaft 164 the nose 168 of the pawl 167 will be positioned in the path of the wall 156 of the cutout 154 and under such conditions it will act as a stop and cause the element 151 to be held stationary while the holder is rotating. Upon continued rotation of the holder, the face of the coupling pin will engage the face of the element 151. Since the coupling pin 139 is still engaged with the prime mover, it will be forcibly driven across the inclined surface of the plate 151 thereby moving pin 139 from engagement with hub 128 and disconnect the driven structure from the prime mover.

The holder 112 is provided with a suitable brake, as indicated at 170 (Figure 18).

What I claim is:

1. In a safety control for a machine of that type including an oppositely movable explorer, the combination of an operating shaft, a revoluble element loosely mounted on and into which extends said shaft, an oppositely movable clutching plate slidably mounted on said shaft within said element, said shaft and plate having coacting portions for clutching said element to the shaft on the moving of the plate in one direction of its movement, means for retaining the plate in one direction of its movement, means for retaining the plate in clutching relation with respect to the shaft, and a normally latched shifting means for moving the plate to unclutching position and adapted to be connected to the explorer whereby when the explorer, when moving in an exploring direction meets with an obstruction, releases said shifting means to act on said plate to move the latter in the other direction of movement to unclutch the plate from said shaft thereby discontinuing the operation of said element.

2. In a safety control for a machine of that type including an oppositely movable explorer, the combination of an operating shaft, a revoluble element loosely mounted on and into which extends said shaft, an oppositely movable clutching plate slidably mounted on said shaft within said element, said shaft and plate having coating portions for clutching said element to the shaft on the moving of the plate in one direction of its movement, means for retaining the plate in clutching relation with respect to the shaft, and a normally latched shifting means for moving the plate to unclutching position and adapted to be connected to the explorer whereby when the explorer, when moving in an exploring direction meets with an obstruction, releases said shifting means to act on said plate to move the latter in the other direction of movement to unclutch the plate from said shaft thereby discontinuing the operation of said element, the said shifting means including a pivotally mounted bell crank member actuated from said element and to which the explorer is connected and moved by.

3. In a safety control for a machine of that type including an oppositely movable explorer, the combination of an operating shaft, a revoluble element loosely mounted on and into which extends said shaft, an oppositely movable clutching plate slidably mounted on said shaft within said element, said shaft and plate having coacting portions for clutching said element to the shaft on the moving of the plate in one direction of its movement, means for retaining the plate in clutching relation with respect to the shaft, and a normally latched shifting means for moving the plate to unclutching position and adapted to be connected to the explorer whereby when the explorer, when moving in an exploring direction meets with an obstruction, releases said shifting means to act on said plate to move the latter in the other direction of movement to unclutch the plate from said shaft thereby discontinuing the operation of said element, said shifting means including a pocket formed in one face of said element, a combined retainer and actuator including a part for traveling in said pocket and a part for disposing in the path of one end of the plate for moving the latter to non-clutching position and a pivotally mounted bell crank lever actuated from said element and to which the explorer is connected and moved by.

4. In a safety control for a machine of that type including an oppositely movable explorer, the combination of a driving element, an oppositely movable latchable carrier slidably mounted in, bodily movable with and selectively extendible from opposite sides of said element, said carrier being provided with a crank pin for positioning concentrically with respect to and eccentrically of the axis of said element on the oppositely moving of the carrier for respectively making active and inactive a driven structure adapted to be connected to and operated by the pin, and a normally latched shifting means for oppositely moving the carrier to selectively dispose the crank pin in its eccentric and concentric position, and adapted to be connected to the explorer for moving the latter whereby when the explorer meets with an obstruction when exploring, during a cycle of said element for the said shifting means acting on the carrier to provide for the automatic shifting of the pin from eccentric to concentric position and from concentric to eccentric position.

5. In a safety control for a machine of that type including an oppositely movable explorer, the combination of a driving element, an oppositely movable latchable carrier slidably mounted in, bodily movable with and selectively extendible from opposite sides of said element, said carrier being provided with a crank pin for positioning concentrically with respect to and eccentrically of the axis of said element on the oppositely moving of the carrier for respectively making active and inactive a driven structure adapted to be connected to and operated by the pin, and a normally latched shifting means for oppositely moving the carrier to selectively dispose the crank pin in its eccentric and concentric positions and adapted to be connected to the explorer for moving the latter whereby when the explorer meets with an obstruction when exploring, during a cycle of said element for the said shifting means acting on the carrier to provide for the automatic shifting of the pin from eccentric to concentric position and from concentric to eccentric position, the said shifting means including a pivotally mounted bell crank lever actuated from said element and to one arm of which the explorer is connected and moved by.

6. In a safety control for a machine of that type including an oppositely movable explorer, the combination of a driving element, an oppositely movable latchable carrier slidably mounted in, bodily movable with and selectively extendible from opposite sides of said element, said carrier being provided with a crank pin for positioning concentrically with respect to and eccentrically of the axis of said element on the oppositely moving of the carrier for respectively making active and inactive a driven structure adapted to be connected to and operated by the pin, a normally latched shifting means for oppositely moving the carrier to selectively dispose the crank pin in its eccentric and concentric positions and adapted to be connected to the explorer for moving the latter whereby when the explorer meets with an obstruction when exploring, during a cycle of said element for the said shifting means acting on the carrier to provide for the automatic shifting of the pin from eccentric to concentric position and from concentric to eccentric position, the said shifting means including a pocket formed in one face of said element, a combined retainer and actuator including a part travelling in said pocket and a part for disposing in the path of an extended end of the carrier for moving the latter from one position of the pin to the other position of the pin and a pivotally mounted bell crank lever actuated from said element and to one arm of which the said explorer is connected and moved by.

7. In a safety control for a machine of that type including an oppositely movable explorer, the combination of a driving element including a head part formed on its forward face with a groove, an oppositely movable carrier slidably mounted in, bodily moving with and selectively extended from the opposite ends of said groove, said carrier being provided with a crank pin for selectively positioning concentrically with and eccentrically of the axis of said element on the opposite moving of a carrier in said groove for respectively making inactive and active a driven structure adapted to be connected to and made active from the pin, a locking device for releasably holding said carrier when positioning the crank pin eccentrically, a latching device for said carrier when positioning said pin concentrically, and a normally latched shifting means coacting with said locking device and with the carrier for oppositely moving the carrier to selectively dispose the crank pin in its eccentric and concentric positions and adapted to be connected to the explorer for moving the latter whereby when the explorer meets with an obstruction during a cycle of said element for the said shifting means acting on the carrier and the latching device to provide for the automatic shifting of the pin from eccentric to concentric position and from concentric to eccentric position.

8. In a control device for automatically disconnecting a driven structure from a driving structure of a machine of that type including an explorer moving with the driven structure, the combination of a normally latched slidably mounted spring controlled coupling pin adapted to be carried by the driven structure and for engaging in the driving structure whereby the driven structure will be operated from the driving structure, a shifting element revolubly mounted on said driven structure for and through which said pin extends, and a controlling element for said shifting element, and said pin having coacting parts adapted for correlation with and made active when the explorer meets with an obstruction for holding said shifting element thereby moving the pin clear of the driving structure to discontinue the operation of the driven structure.

9. In a control device for automatically disconnecting a driven structure from a driving structure of a machine of that type including an explorer moving with the driven structure, the combination of a normally latched slidably mounted spring controlled coupling pin adapted to be carried by the driven structure and for engaging in the driving structure whereby the driven structure will be operated from the driving structure, a shifting element revolubly mounted on said driven structure for and through which said pin extends, and a controlling element for said shifting element, and said pin having coacting parts adapted for correlation with and made active when the explorer meets with an obstruction for holding said shifting element thereby moving the pin clear of the driving structure to discontinue the operation of the driven structure, the said controlling element being in the form of a rock shaft carrying a spring urged pawl for coaction with the explorer and a pawl for coaction with said shifting element.

10. In a control device for automatically disconnecting a driven structure from a driving structure of a machine of that type including an explorer moving with the driven structure, the combination of a normally latched slidably mounted spring controlled coupling pin adapted to be carried by the driven structure and for engaging in the driving structure whereby the driven structure will be operated from the driving structure, a shifting element revolubly mounted on said driven structure for and through which said pin extends, and a controlling element for said shifting element, and said pin having coacting parts adapted for correlation with and made active when the explorer meets with an obstruction for holding said shifting element thereby moving the pin clear of the driving structure to discontinue the operation of the driven structure, the said pin being formed intermediate its ends with a pair of spaced beveled surfaces, and said shifting element being formed with a beveled surface for coaction with one of the beveled surfaces of the pin for moving the latter from its engagement with the driving structure.

11. In a machine of that type including a prime mover, a driven structure formed with a movable member operating through a normal path and an explorer for determining the presence of an obstacle in said path, the combination of an oppositely shiftable driver disposed in slidable relation with respect to the prime mover and providing when shifted in one direction for the operation of said structure from the prime mover, and a normally inactive spring urged means for correlation with said driver and controlled from and made active when the explorer meets with an obstacle disposed in the normal path of said member to thereby provide for shifting said driver in the opposite direction to discontinue the operation of the driven structure from said prime mover and to prevent said member operating through said normal path.

12. In a machine of that type including a prime mover, a driven structure formed with a movable member operating through a normal path and an explorer for determining the presence of an obstacle in said path, the combination of a carrier structure revoluble from the prime mover and including an oppositely shiftable driver providing when shifted in one direction for the operation of the driven structure from the prime mover, an oscillatory lever operated from the carrier structure and carrying said explorer, and a normally inactive spring urged means for correlation with the carrier structure and lever and controlled from and made active when the explorer meets with an obstacle disposed in said path for shifting said driver in its other direction to discontinue the operation of the driven structure from said prime mover to thereby prevent said member operating through said normal path.

13. In a machine of that type including a prime mover, a driven structure formed with a movable member operating through a normal path and an explorer for determining the presence of an obstacle in said path, the combination of an oppositely shiftable spring controlled cammed driver slidably mounted in said driven structure and normally moved in one of its directions to slidably engage in the prime mover to provide for the operation of the driven structure from said prime mover to thereby move said member in its normal path and a normally inactive spring urged means for correlation with said driver and controlled from and made active when the explorer meets with an obstacle disposed in the normal path of said member for shifting said driver in its other direction to discontinue the operation of the driven structure from said prime mover to thereby prevent said member operating through said normal path.

ARNOLD FERDINAND FISCHER.